United States Patent [19]

Hamamura et al.

[11] Patent Number: 4,961,803
[45] Date of Patent: Oct. 9, 1990

[54] THIN FILM LAMINATING METHOD AND APPARATUS

[75] Inventors: Fumio Hamamura; Shigeo Sumi, both of Tokyo, Japan

[73] Assignee: Somar Corporation, Tokyo, Japan

[21] Appl. No.: 332,903

[22] Filed: Apr. 4, 1989

[30] Foreign Application Priority Data

Apr. 4, 1988 [JP] Japan .................. 63-82552
Apr. 4, 1988 [JP] Japan .................. 63-82553
Jun. 3, 1988 [JP] Japan .................. 63-137050

[51] Int. Cl.⁵ ............... B32B 31/00; B32B 31/04; B44C 1/22; C23F 1/02
[52] U.S. Cl. .................. 156/238; 156/249; 156/269; 156/540; 156/552; 156/902
[58] Field of Search ............ 156/630, 634, 656, 659.1, 156/902, 235, 238, 241, 248, 249, 269, 270, 285, 290, 300, 302, 303, 324, 443, 459, 475, 522, 540, 543, 552

[56] References Cited

U.S. PATENT DOCUMENTS

| 3,629,036 | 12/1971 | Isaacson | 156/241 X |
| 3,658,629 | 4/1972 | Cramer et al. | 156/552 |
| 4,127,436 | 11/1978 | Friel | 156/634 X |
| 4,840,698 | 6/1989 | Kuehnert | 156/540 X |

Primary Examiner—William A. Powell
Attorney, Agent, or Firm—Sughrue, Mion, Zinn, Macpeak & Seas

[57] ABSTRACT

An apparatus for laminating a thin film to a base plate is disclosed in which the leading edge of the film is tentatively stuck to the surface of the plate at the leading edge of the plate in a base plate conveyance passage. A pair of pressure sticking rollers are put into contact with the leading edge of the film in a tentative sticking position and then rotated so that the plate is conveyed and the film is completely stuck to the plate. A wet roller unit provided on the passage, upstream of the position, to cause an air bubble preventive agent to cling to the plate. The agent is nearly uniformly fed from the interior of the wet roller unit to the outside surface thereof. The agent remaining on the film stuck to the plate is removed from the film, downstream of the pressure sticking roller unit.

9 Claims, 11 Drawing Sheets

THIN FILM LAMINATING METHOD AND APPARATUS

BACKGROUND OF THE INVENTION

The present invention relates to an art of sticking a thin film, and particularly relates to an effective art of sticking a thin film to the surface of a base plate.

In a printed circuit board for an electronic machine such as a computer, wirings of copper or the like are provided in a prescribed pattern on one or both sides of an electrically insulating base plate. The printed circuit board is manufactured in a process described from now on. A stratified body consisting of a photosensitive resin layer and a light-transmissible resin film for protecting the layer is first stuck, under heat and pressure, to an electroconductive layer provided on the electrically insulating base plate and made of a thin copper film. The heat and pressure sticking is preformed by a thin film sticking apparatus in a mass production manner. A wiring pattern film is then over laid on the stratified body. The photosensitive resin layer is exposed to light through the wiring pattern film and the light-transmissible resin film for a prescribed time. After the light-transmissible resin film is peeled from the stratified body by a peeling apparatus, the photosensitive resin layer exposed to the light is developed so that an etching mask pattern is made. After that, the unnecessary portion of the electroconductive layer is removed by etching, and the remaining portion of the photosensitive resin layer is then removed The printed circuit board having the prescribed wiring pattern is thus manufactured.

Since the surface of the above-mentioned electroconductive layer has minute recesses and projections, air is left in the recesses when the stratified body is stuck to the surface of the layer. For that reason, air bubbles are generated between the mutually stuck surfaces of the electroconductive layer and the stratified body to decrease the adhesive power between them to lower the reliability of the wirings of the printed circuit board.

SUMMARY OF THE INVENTION

The present invention was made in order to solve the problem.

Accordingly, it is an object of the present invention to provide an art of sticking a thin film to a base plate so as to enhance the reliability of the assembly of the base plate and the thin film stuck thereto.

It is another object of the present invention to provide an art of sticking a thin film to a base plate so as to enhance the reliability of a printed circuit board made of the base plate.

It is yet another object of the present invention to provide an art of sticking a stratified film to an electroconductive layer made of copper on a base plate, so as to prevent air bubbles from being generated or left between the mutually stuck surfaces of the stratified film and the electroconductive layer.

It is yet another object of the present invention to provide an art of sticking a thin film to a base plate so that an air bubble preventive agent remaining on the thin film stuck to the base plate is removed from the film, downstream to a pressure sticking roller.

The above-mentioned and other objects and novel features of the present invention will be apparent from the description herein and the drawings attached thereto.

According to the present invention, a method of laminating a thin film to a base plate is provided in order to attain the abovementioned objects. In the method, an air bubble preventive agent is caused to cling to the base plate before the plate is conveyed to a tentative sticking position in a base plate conveyance passage, the leading edge of the film is tentatively stuck to the surface of the base plate at the leading edge thereof, and a pressure sticking roller is put into contact with the tentatively-stuck leading edge of the film in the tentative sticking position and then rotated so that the base plate is conveyed and the film is completely stuck to the plate. The method is characterized in that the air bubble preventive agent is caused to cling to the base plate before the plate is conveyed to the tentative sticking position, and the agent remaining on the film stuck to the plate is removed from the film, downstream to the pressure sticking roller.

According to the present invention, an apparatus for laminating a thin film to a base plate is provided in order to attain the above-mentioned objects. In the apparatus, the leading edge of the thin film is tentatively stuck to the surface of the base plate at the leading edge of the plate in a base plate conveyance passage, and a pressure sticking roller is put into contact with the leading edge of the film in a tentative sticking position and then rotated so that the plate is conveyed and the film is completely stuck to the plate. The apparatus is characterized by including a wet roller provided on the base plate conveyance passage, upstream to the tentative sticking position, to cause an air bubble preventive agent to cling to the baseplate, a men for nearly uniformly feeding the agent from the interior of the wet roller to the outside surface thereof, and a means by which the agent remaining on the thin film stuck to the base plate is removed from the film, downstream to the pressure sticking roller.

DESCRIPTION OF THE PREFERRED EMBODIMENTS

An embodiment of the present invention, which is a thin film laminating apparatus by which stratified bodies, each of which consists of a light-transmissible resin film,. a photosensitive resin layer and another light-transmissible resin film, are stuck, under heat and pressure, to electroconductive layers on a electrically insulating base plate, is hereafter described with reference to the drawings attached hereto. The mutually equivalent portions shown in the drawings are denoted by the same reference symbols therein.

Figure 1:
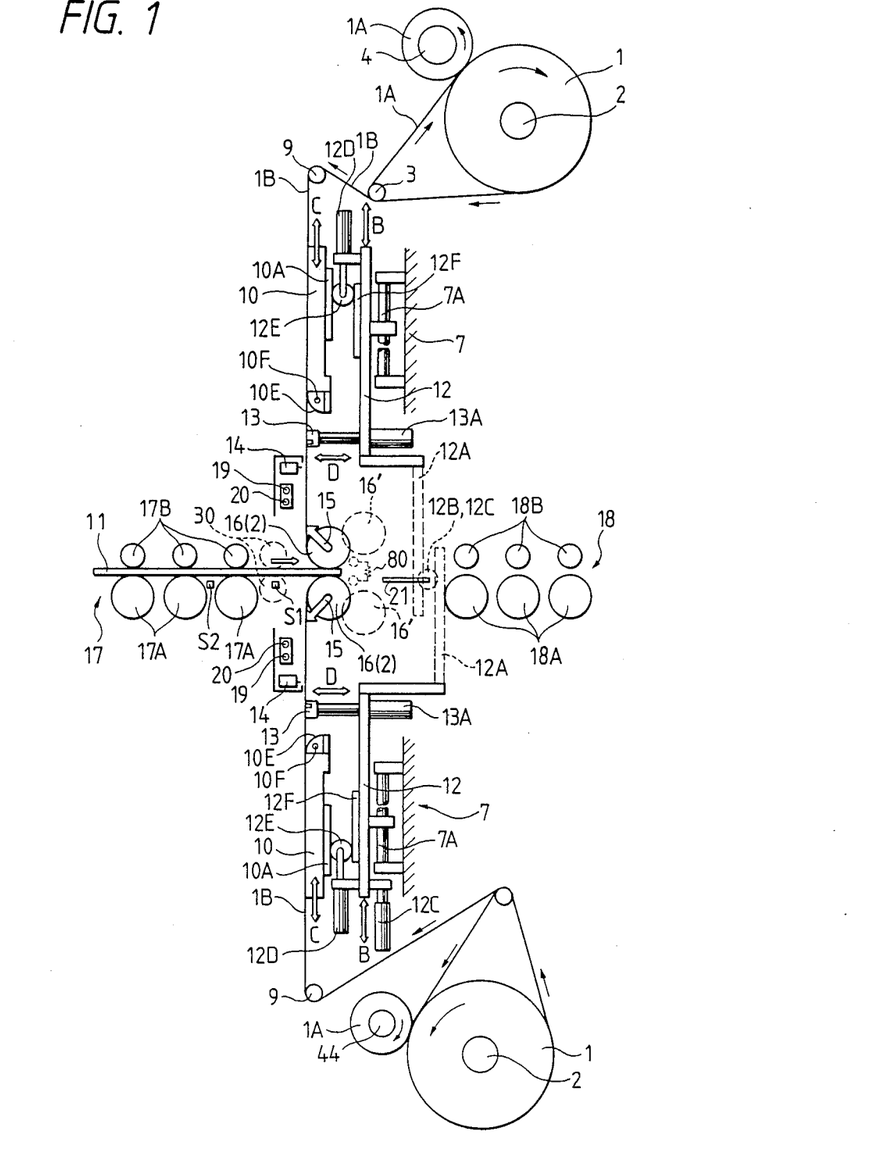
FIG. 1 shows a schematic view of a thin film laminating apparatus which is an embodiment of the present invention.

FIG. 1 shows a schematic view of the thin film laminating apparatus. Each stratified body 1 is continuously wound on a feed roller 2 in advance. The stratified body 1 supplied from the feed roller 2 is divided, at a thin film separation roller 3, into the light-transmissible resin film 1A and a stratified. body 1B consisting of the other light-transmissible resin film and the photosensitive resin layer uncoated at one side thereof, which is to be stuck to the conductive layer on the electrically insulating base plate 11. The light-transmissible resin film 1A divided from the stratified body 1B is wound on a winding roller 4.

Figure 2:
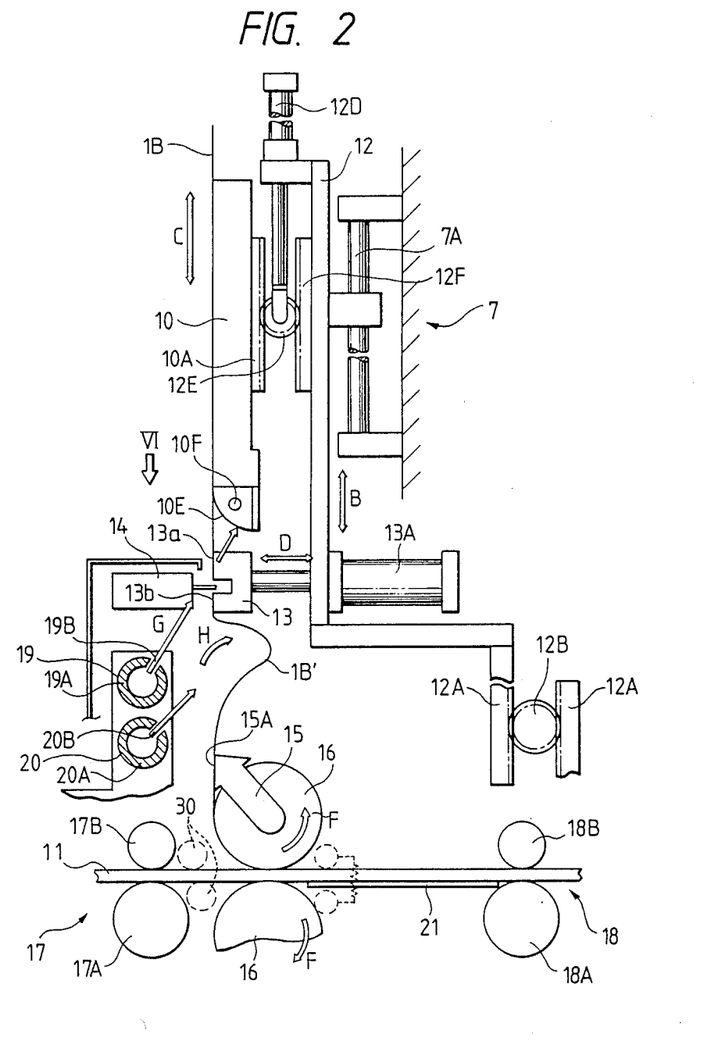
FIG. 2 shows an enlarged partial view of the thin film laminating apparatus.

As shown in FIGS. 1 and 2, the leading edge of the stratified body 1B divided from the film 1A at the separation roller 3 is fed along a tension roller 9 and then sucked onto a main vacuum suction plate 10 which is a thin film feed member. The tension roller 9 acts to apply an appropriate tensile force to the stratified body 1B between the feed roller 2 and the main vacuum suction plate 10 to prevent the stratified body from undergoing a wrinkle or the like which being fed to the plate.

The plate 10 acts to feed the stratified body 1B form the feed roller 2 to the conductive layer made of a thin copper film or the lie on the electrically insulating base plate 11. The main vacuum suction plate 10 is provided on a support member 12, which is moved toward and away from the base plate 11 as shown by arrows B. The support member 12 is provided on the body 7 of the thin film sticking apparatus so that the support member is slidable along a guide member 7A in the directions of the arrows B. A pair of such support members 12 are provided over and under the conveyance passage for the base plate 11. The upper and the lower support members 12 are movably connected to each other by a rack and pinion mechanism so that the support members 12 are simultaneously moved toward and away from each other by a driver 12C coupled to -the lower support member. The rack and pinion mechanism includes racks 12A provided on the support members 12, and a pinion 12B engaged with the racks. The driver 12C is made of a pneumatic cylinder, but may be made of another means such as a hydraulic cylinder an electromagnetic cylinder and a combination of a stepping motor and a mechanism for transmitting the motive power of the motor to the support members 12.

The upper and the lower main vacuum suction plates 10 are provided at the support members 12 so that the suction plates are moved toward and away from the insulating base plate 11 as shown by arrows C, independently of the movement of the support members 12, by drivers 12D and rack and pinion mechanisms. The drivers 12D are provided on the support members 12. The drivers 12D are made of the same kind of means as the driver 12C. For example, the drivers 12C and 12D are made of pneumatic cylinders which are controlled by solenoid valves. The rack and pinion mechanisms include pinions 12E coupled to the drivers 12D, racks 12F provided on the support members 12, and other racks 10A provided on the main vacuum suction plates 10.

Each main vacuum suction plate 10 has a plurality of suction holes (not shown) for sucking the stratified body 1B and holding it on the plate. The suction holes are communicated with a vacuum source such as a vacuum pump through an air discharge pipe. The sucking action of the main vacuum suction plate 10 and that of a tentative sticking portion 10E are controlled independently of each other. The tentative sticking portion 10E is provided on the main vacuum suction plate 10 at the end thereof downstream of the plate in the direction of feed of the stratified body 1B, and has an arc-shaped surface for sucking the stratified body onto the tentative sticking portion. The portion 10E is provided is integrally coupled with the plate 10. A heater 10F for heating the arc-shaped surface of the portion 10E is therein. The portion 10E acts so that the leading edge of the stratified body 1B fed by the main vacuum suction plate 10 is tentatively stuck, under heat and pressure, to the electroconductive layer on the base plate 11. The main vacuum suction plate 10 and the portion 10E may be separately provided and supported by the support member 12.

An auxiliary vacuum suction plate 13, which is a thin film holding member 13, is provided near the tentative sticking portion 10E, along the feed passage for the stratified body 1B between the portion and the base plate 11. As shown in FIG. 2, the plate 13 has an upper sucking portion 13a and a lower sucking portion 13b which are disposed in the form of a U so that the position of the open space between the upper and the lower sucking portions 13a and 13b corresponds to that of cutoff of the laminated body 1B. The plate 13 has suction holes which are not shown in the drawings. The upper sucking portion 13a mainly sucks the leading edge of the laminated body 1B so that the edge is sucked on the tentative sticking portion 10E. The plate 13 is coupled to the support member 12 by a driver 13A so that the plate can be moved toward and away from the feed passage for the laminated body 1B as shown by arrows D, to suck the leading edge òf the laminated body onto the tentative sticking portion 10E. The driver 13A is made of a pneumatic cylinder, but may be replaced by another means such as a hydraulic cylinder. The trailing edge of the cut-off portion of the laminated body 1B, which is cut off by a cutoff unit 14, is sucked by the lower sucking portion 13b of the plate 13 so that the trailing edge is held in the feed passage for the laminated body 1B. The lower sucking portion 13b acts so that after the start of the heat and pressure sticking of the laminated body 1B to the base plate 11, the laminated body is formed with a loose portion 1B' between the lower sucking portion 13b and a rotary vacuum suction plate 15 as shown n FIG. 2. The speed of the feed of the laminated body 1B by the main vacuum suction plate 10 is made higher than the circumferential velocity (the heat and pressure laminated speed) of a heat and pressure sticking roller 16 by a sequence control circuit not shown in the drawings, to form the loose portion 1B'; of the laminated body 1B.

The cutoff unit 14 is secured to the body 7 of the apparatus, near the feed passage for the laminated body 1B between the tentative sticking portion 10E and the rotary vacuum suction plate 15, and faces the auxiliary vacuum suction plate 13 which brings the to-be-cut-off portion of the laminated body to the position of cutoff thereof. The cutoff unit 14 is located at an upstream conveyor which conveys the base plate 11. The cutoff unit 14 may be provided on the conveyor 17. The cutoff unit 14 acts so that the laminated body 1B continuously fed is cut off to a prescribed length corresponding to the length of the base plate 11.

The laminated body 1B with its leading edge tentatively stuck, under heat and pressure, to the conductive layer on the base plate 11 by the tentatively sticking portion 10E, the heat and pressure sticking roller 16 is in a put-aside position 16(1) shown by a dotted line in FIG. 1, so that the roller is out of contact with the tentatively sticking portion moved to a tentative sticking position. After the tentative sticking, the roller 16 is moved from the put-aside position 16(1) to the tentative sticking position 16(2) shown by a full line in FIG. 1, so that the upper and the lower heat and pressure sticking rollers 16 pinch the upper and the lower laminated bodies 1B and the base plate 11.

The trailing edge of the laminated body 1B cut off by the cutoff unit 14 is guided by the triangularly-shaped rotary vacuum suction plate 15 so that the laminated body does not undergo a wrinkle or the like and is stuck, under heat and pressure, to the conductive layer on the base plate 11. The rotary vacuum suction plate 15 is supported by the same shaft as the heat and pressure sticking roller 16 so that the plate is turned about the shaft. The plate 15 has a plurality of suction holes 15A in a suction surface which faces the laminated body 1B. The constitution of the suction surface having the suction holes 15A is similar to that of the suction surface of the main vacuum suction plate 10. Other suction holes may be provided in the top of the rotary vacuum suction plate 15. As a result, the laminated body 1B is easily formed with the loose portion 1B'.

Figure 3:
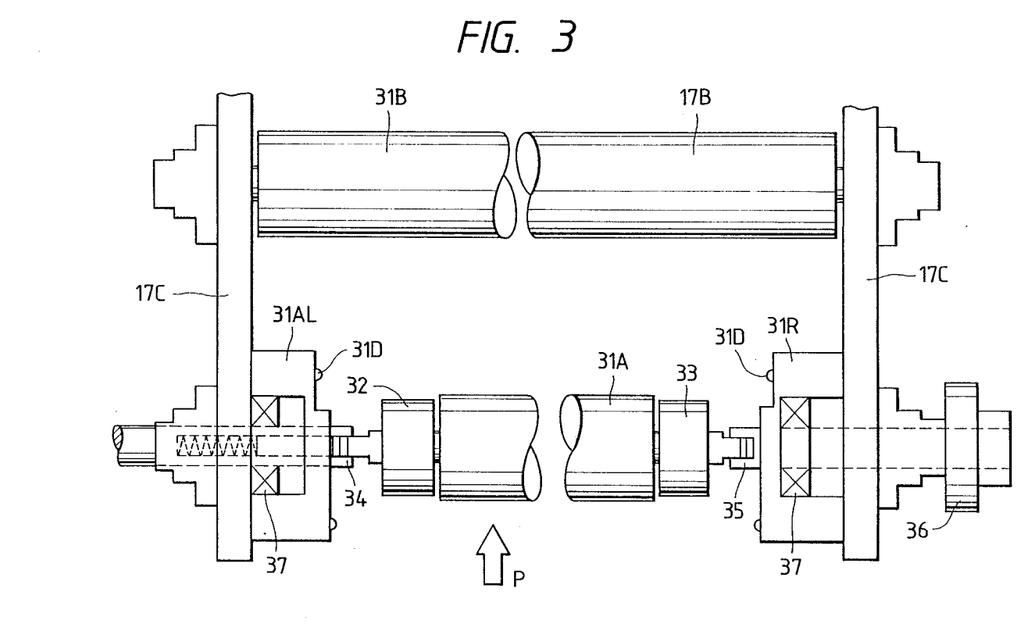
FIG. 3 shows a plan view of the water application wet roller unit of the thin film laminating apparatus.
Figure 4:
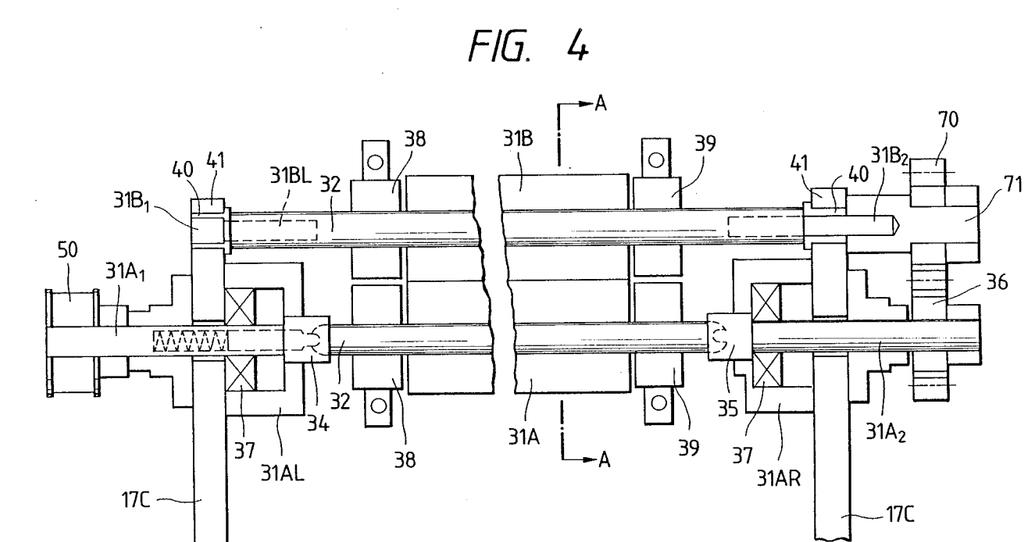
FIG. 4 shows a front view of the water application wet roller unit seen in a direction P shown in FIG. 3.
Figure 5:
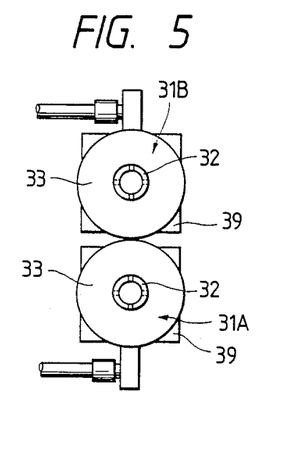
FIG. 5 shows a sectional view of the water application wet roller unit along a line A—A shown in FIG. 4.
Figure 6:
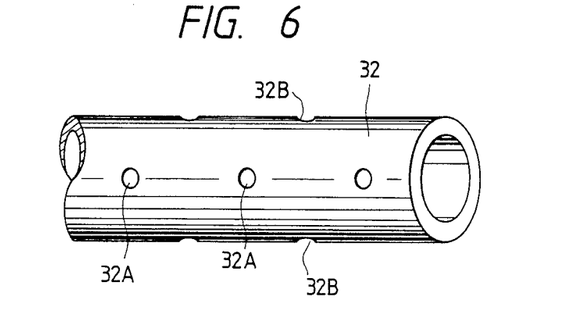
FIG. 6 shows a perspective view of the water feed pipe of the water application wet roller unit.

As shown in FIGS. 1 and 2, the electrically insulating base plate 11 is conveyed to the tentative sticking position by the upstream conveyor 17 including lower driving conveyance rollers 17A and upper idle conveyance rollers 17B. A wet roller unit 30 for causing water as an air bubble preventive agent to cling to the conductive layers on the base plate 11 before the plate is conveyed to the tentative sticking position is provided in the conveyor 17. As shown in FIGS. 3, 4 and 5, the wet roller unit 30 includes a pair of lower wet roller 31A and upper wet roller 31B which are rotatably supported by the frame 17C of the conveyor 17. The wet roller unit 30 is located upstream to the heat and pressure sticking roller 16. As shown in FIG. 5, each of the wet rollers 31A and 31B is composed of a water feed pipe 32 having a plurality of water feed holes 32A and 32B and made of a rust-resistant metal such as stainless steel and aluminum processed not to rust, and a cover layer 33 provided on the pipe and made of such a porous material of high water containing capacity as sponge.

Figure 7:
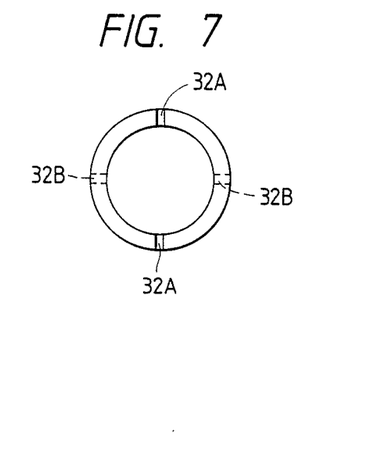
FIG. 7 shows a sectional view for describing the disposition of the water feed holes of the water feed pipe.

As shown in FIG. 7, the water feed holes 32A and 32B are provided in the water feed pipe 32 of the lower wet roller 31A so that the holes 32A are opposed to each other on a diameter of the pipe, the other holes 32B are opposed to each other on another diameter of the pipe, both the holes are located at prescribed intervals, and the angular difference between the mutually adjacent holes on the cross section of the pipe is 90°.

The water feed holes 32A and 32B may as well be provided in the water feed pipe 32 so as to be located in a zigzag or staggered manner, or located at prescribed intervals with an angular difference of 60° or 120° between the mutually adjacent holes on the cross section of the pipe.

The water feed pipe 32 of the lower wet roller 31A is removably connected to couplers 34 and 35 provided at the rotary shafts 32A$_1$ and 31A$_2$ of the roller.

The rotary shaft 31A$_1$ is rotatably connected, through a bearing unit 31AL, to the same driver as the driving conveyance rollers 17A so that the wet roller 31A is rotated synchronously with the conveyance rollers. The bearing unit 31AL is secured to the frame 17C of the upstream conveyor 17 by screws.

The other rotary shaft 31A$_2$ of the lower wet roller 31A is rotatably supported by a bearing unit 31AR and fitted with a gear 36. The bearing units 31AL and 31aR include bearings 37.

A water feeder 38 is provided on the water feed pipe 32 of the lower wet roller 31A at one end of the pipe. A water drainer 39 is provided on the water feed pipe 32 of the roller 32A at the other end of the pipe. Another water feeder 38 is provided on the water feed pipe 32 of the upper wet roller 31B at one end of the pipe. Another water drainer 39 is provided on the pipe 32 of the roller 31B at the other end of the pipe. The water feeders 38 and the water drainers 39 are attached to the frame 17C of the upstream conveyor 17.

The upper wet roller 31B is an idle roller, and has rotary shafts 31B$_1$ and 31B$_2$ at both the ends of the water feed pipe 32. Bearings 40 made of material having a lower hardness than the frame 17C of the conveyor 17 are provided on the rotary shafts 31B$_1$ and 31B$_2$ and removably fitted in the U-shaped notches 41 of the frame. As shown in FIG. 4, a gear 70 is attached to the rotary shaft 31B$_2$ at one end thereof by an attaching member 71 and engaged with the gear 36 attached to the rotary shaft 21A$_2$ of the lower wet roller 21A, so that the torque of the lower wet roller is transmitted to the upper wet roller 31B.

Figure 8:
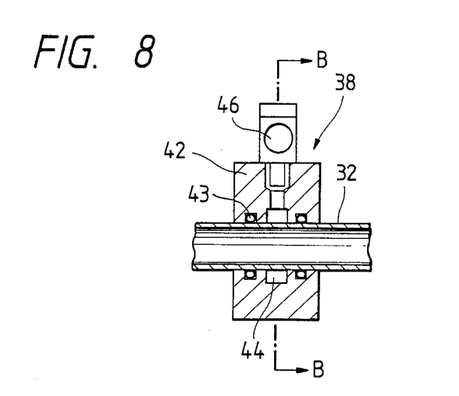
FIG. 8 shows a sectional view of the water feeder of the water application wet roller unit.
Figure 9:
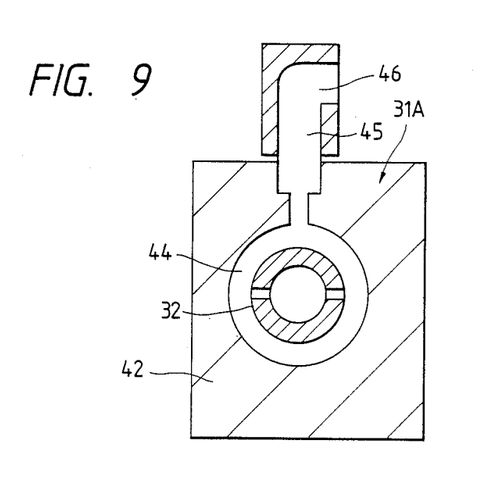
FIG. 9 shows an enlarged sectional view of the water feeder along a line B—B shown in FIG. 8.

As shgown in FIGS. 8 and 9, each water feeder 38 includes a support member 42 surrounding the water feed pipe 32, and O-rings 43 rotatably fitted on the pipe and sealing it. A reservoir 44 is provided in the central portion of the support member 42 and connected to one end of a water feed hole 45, the other end of which has a water feed port 46. The support member 42 is located so that the water feed holes 32A and 32B of the water feed pipe 32 are positioned on the reservoir 44. Each water drainer 39 has the same constitution as the water feeder 38.

Figure 10:
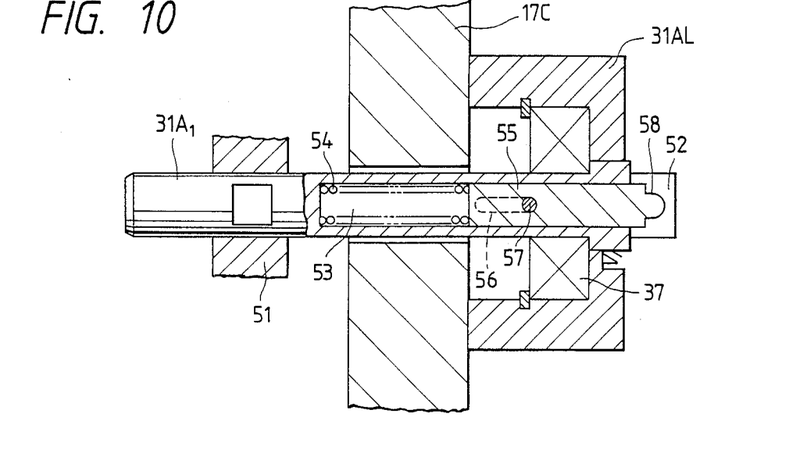
FIGS. 10, 11, 12, 13 and 14 show view for describing the details of the constitution of the couplers of the water application wet roller unit.
Figure 11:
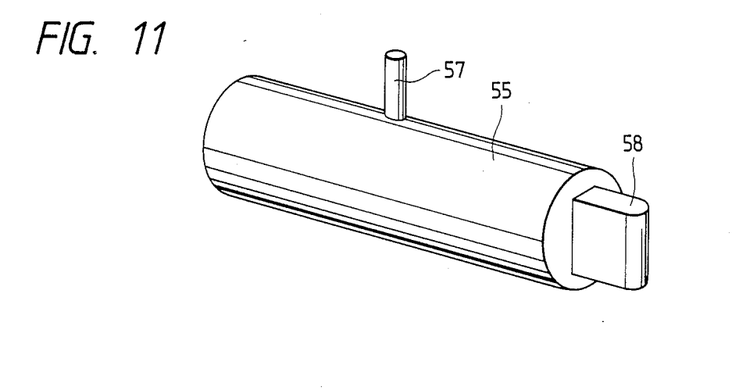
Figure 12:
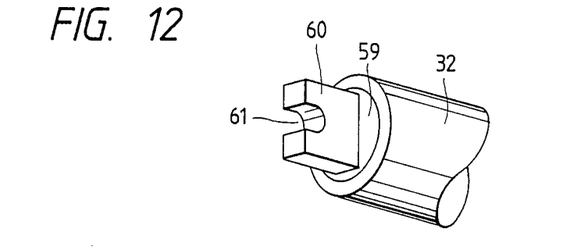

The couplers 34 and 35 will now be described in detail with reference to FIGS. 10, 11, 12, 13 and 14. The coupler 34 for the rotary shaft 31A$_1$ includes a guide opening 52 provided in the central portion of one end of the rotary shaft fitted with a pulley 61 near the other end of the shaft, as shown in FIG. 10. A guide hole 53 concentric to the rotary shaft 31A$_1$ is provided therein and extends from the guide opening 52 toward the pulley 51. A coupling guide bar 55 is fitted in the guide hole 53. A spring 54 such as a coil spring is provided between the bar 55 and the other end of the guide hole 53. A slender opening 56 is provided in the rotary shaft 31A$_1$ and located in a prescribed position on the guide hole 53. A stop pin 57 is secured in a prescribed position to the coupling guide bar 55 as shown in FIG. 11, and is slidably fitted in the slender opening 56 as shown in FIG. 10. A coupling projection 58 is integrally formed on the end of the coupling guide bar 55 at the water feed pipe 32, as shown in FIG. 11. The coupler 34 includes a coupling member 59 provided at the end of the water feed central portion has a coupling opening 61, as shown in FIG. 12.

Figure 13:
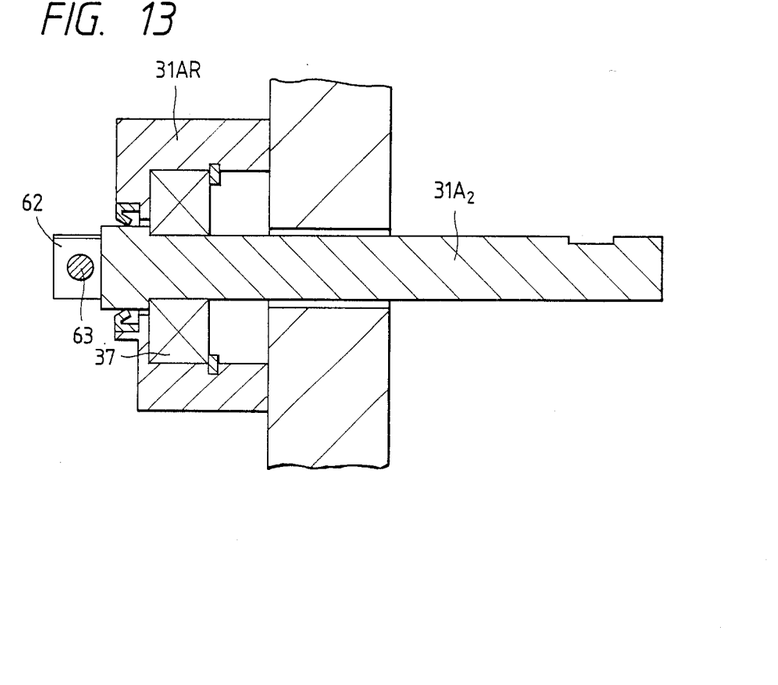
Figure 14:
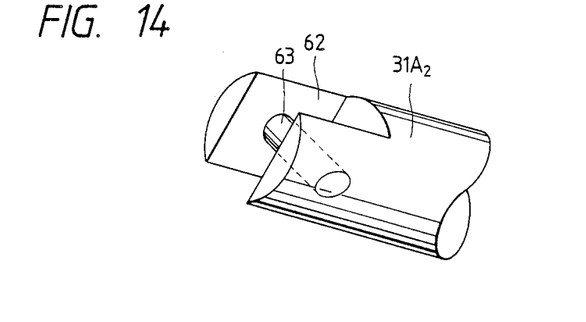

The coupler 35 for the rotary shaft $31A_2$ includes a coupling guide opening 62 provided in one end of the shaft fitted with the gear 36 near the other end of the shaft, and also includes a coupling member 63 extending in the diametrical direction of the shaft across the coupling guide opening, as shown in FIGS. 13 and 14. As shown in FIG. 12, a coupling projection 60 is integrally formed on the central portion of the end of another coupling member 19 at the other end of the water feed pipe 32, and has a coupling opening 61 provided in the central portion of the projection and engaged with the coupling member 63, in the same manner as the other coupler 34.

The operation of the couplers 34 and 35 will now be described. The coupling member 63 of the coupler 35, which is located at the rotary shaft $31A_2$, is first engaged in the coupling opening 61 of the coupler 35, which is located at the rotary shaft $31A_1$, is then manually pushed in against the force of the spring 54 so that the coupling projection 58 at the rotary shaft $31A_1$ is fitted in the coupling opening 61 at the water pipe 32. The pipe 32 is thus coupled to the rotary shafts $31A_1$ and $31A_2$ so that the lower wet roller 31A is attached to the thin film laminating apparatus. When the roller 31A is to be uncoupled from the rotary shafts $31A_1$ and $31A_2$, the Stopper pin 57 of the coupler 34 at the rotary shaft $31A_1$ is manually moved toward the pulley 51 against the force of the spring 54 so that the coupling projection 60 is pushed in, the coupling projection 58 at the rotary shaft $31A_1$ is disengaged from the coupling opening 61 at the water feed pipe 32, and the coupling member 63 at the rotary shaft $31A_2$ is disengaged from the coupling opening 61 of the other coupler 35 at the water feed pipe.

When the upper wet roller 31B is to be attached to the apparatus, the bearings 40, provided on the water feed pipe 32 of the roller at both the ends thereof are removably fitted in the U-shaped notches 41 of the frame 17C of the upstream conveyor 17. When the roller 31B is to be detached from the apparatus, the bearings 40 are removed from the U-shaped notches 41.

Figure 15:
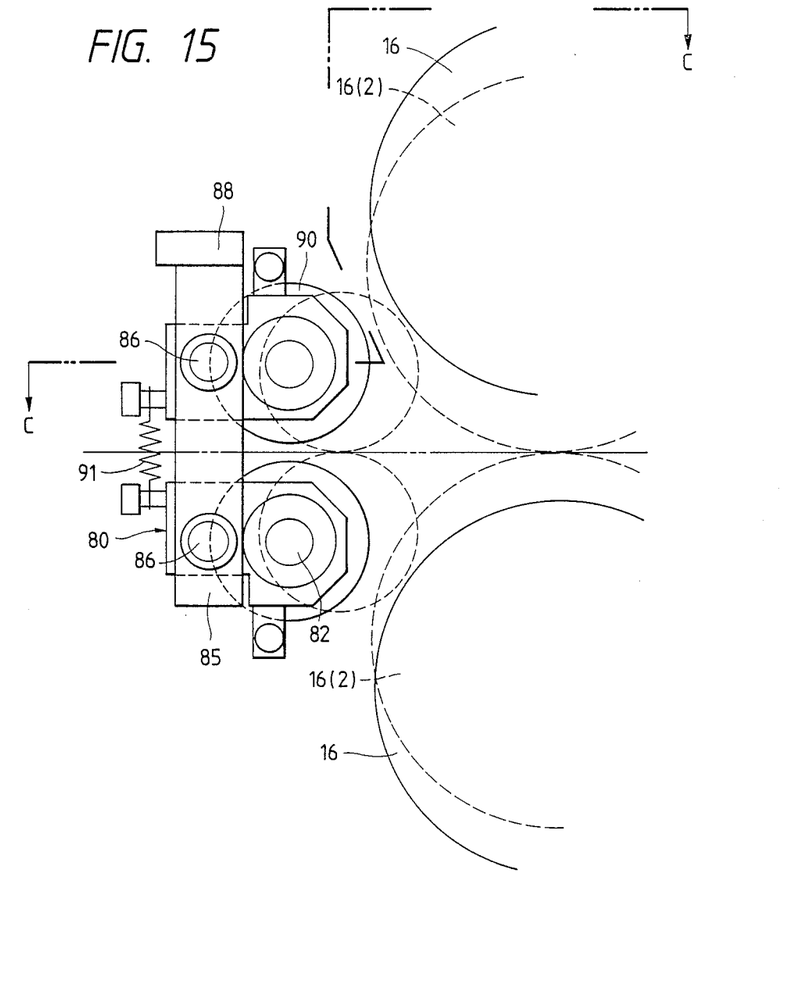
FIG. 15 shows a side view of the water suction unit of the thin film laminating apparatus.
Figure 16:
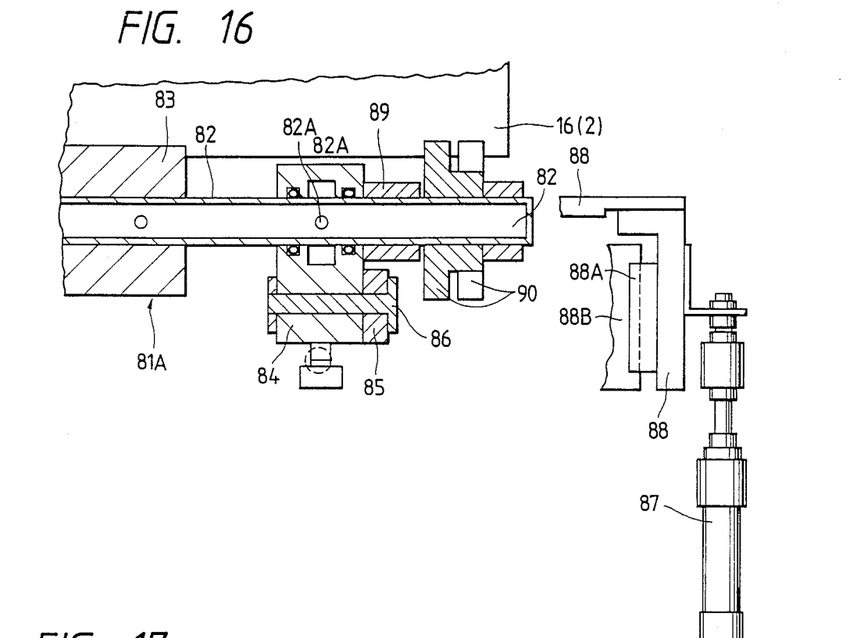
FIG. 16 shows a sectional views of the water suction unit along a line C—C shown in FIG. 15.
Figure 17:
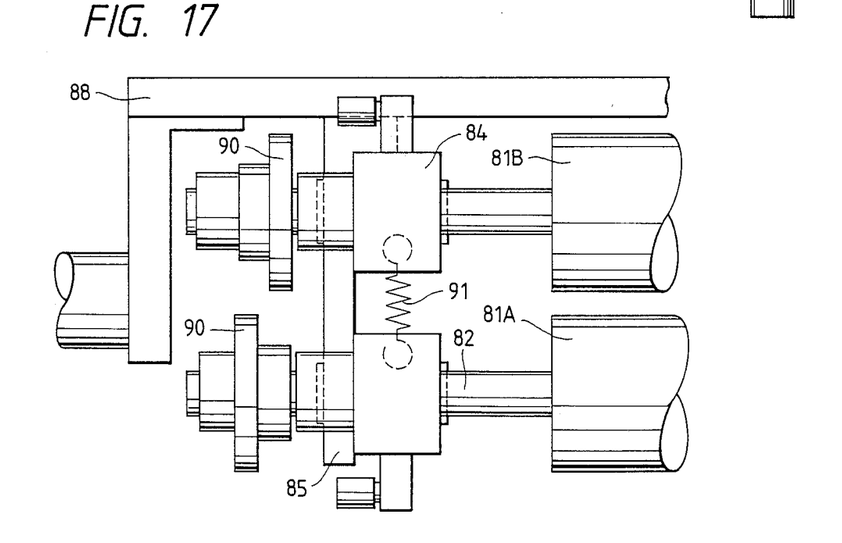
FIG. 17 shows a front view of the water suction unit.

As shown in FIGS. 15, 16 and 17, a water suction unit 80 for removing water from the laminated bodies 1B stuck to the conductive layers on the base plate 11 is rotatably supported downstream to the heat and pressure sticking roller 16. The water suction unit 80 has a pair of lower water suction roller 81A and upper water suction roller 81B. Each of the rollers 81A and 81B includes a water drain pipe 82 having water drain holes 82A, and a water suction layer 83 made of a porous material such as sponge and provided around the water drain pipe. Water drainers 94 are provided at both the ends of the water suction layer 83. The constitution of each of the water drainers 84 is similar to that of the water feeder 38 shown in FIGS. 8 and 9. Each water drainer 84 is rotatably attached to a support member 85 by an attaching pin 86 which serves as a rotary shaft. The support member 85 is attached to a support frame 8i which can be moved by a pneumatic cylinder 87. The support frame 88 is slidably supported with a sliding guide member 88A on a support rail 88B attached to the frame of the body of the apparatus. Idle rollers 90 are provided on collars 89 on the water drain pipe 82 at both the ends thereof near the water drainer 84 so that the idle rollers are pulled inward and rotated by the rotating heat and pressure sticking rollers 16 to rotate the lower and the upper water suction rollers 81A and 81B in conjunction with the rotation of the heat and pressure sticking rollers. When the idle rollers 90 are to be rotated as mentioned above, they are put into contact with the heat and pressure sticking rollers 16 by the pneumatic cylinders 87. The idle rollers 90 for the lower water suction roller 81A are made different in attached position from those 90 for the upper water suction roller 81B with regard to the axial direction of the roller so that the idle rollers do not collide against each other when they are rotated. Tension springs 91 are provided between the support members 85 to pull the members toward each other to return the lower water suction roller 81A, the upper water suction roller 81B and the idle rollers 90 to the original positions thereof against the rotating forces of the heat and pressure sticking rollers 16, which act to rotate the rollers 81A, 81B and 90. The water drainers 84 are sucked by a vacuum suction unit. Since the water suction unit 80 for removing the water remaining on the laminated bodies 1B stuck to the electroconductive layers on the base plate 11 is rotatably supported downstream to the heat and pressure sticking rollers 16, a contamination such as a water globule trace is prevented from being made on the laminated bodies. For that reason, the reliability and yield in making wiring patterns of the conductive layers on the base plate 11 through exposure to light are improved.

Figure 18:
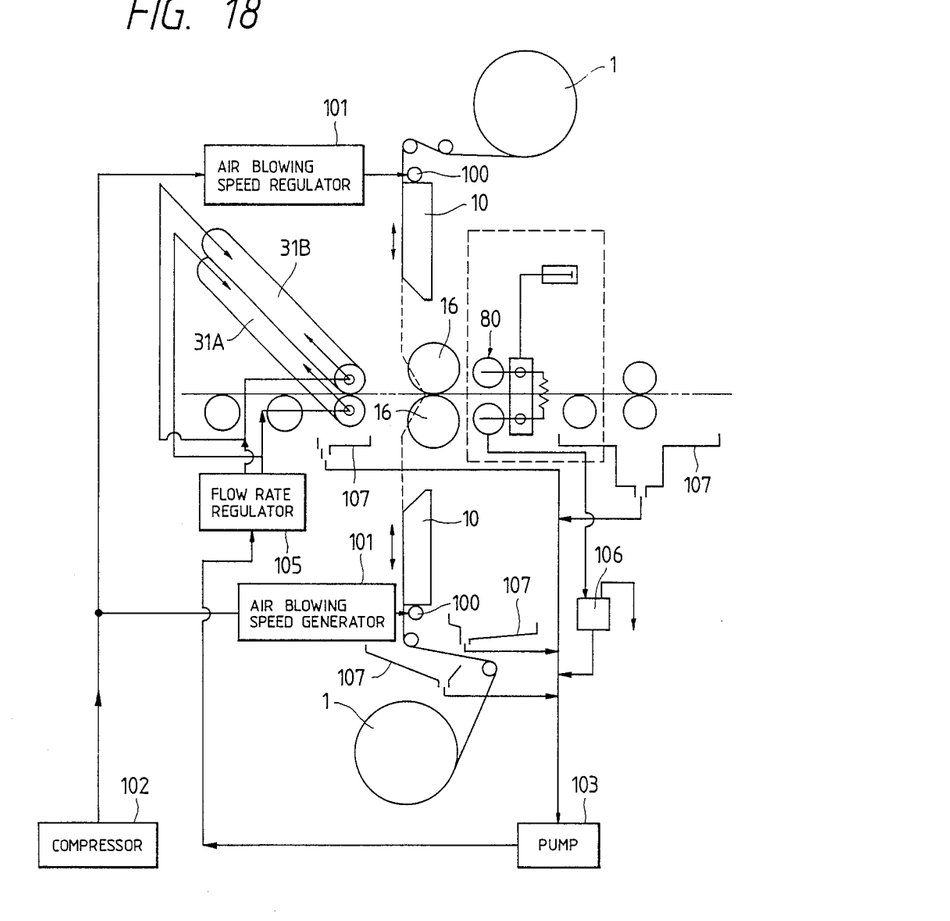
FIG. 18 shows a block diagram of the after feed system and water suction system of the thin film laminating apparatus.

As shown in FIG. 18, an air blowing nozzle unit 100 is provided body 1B from the plate after the leading edge of the body is tentatively stuck to the conductive layer on the base plate 11. The nozzle unit 100 is connected to a compressed air generator 102 through an air blowing speed regulator 101 by which the speed of air blown to the laminated body 1B from the nozzle unit is regulated if necessary. Since it is likely that the downstream end of the tentative sticking portion 10E provided on that of the main vacuum suction plate 10 is wetted with the water applied to the conductive layer on the base plate 11 by the wet roller blowing nozzle unit 100 is provided so that the stratified body 1B tentatively stuck to the conductive layer on the base plate is prevented from being caught on the portion 10E and the plate 10 due to the wetting or the dewing so as to be moved together with the plate 10 and peeled from the base plate 11. As shown in FIG. 18, a pump 103, a flow control valve 105 for regulating the flow rate of the water to be fed to the lower and the upper wet rollers 31A and 31B, a trap 106 for removing water from sucked air, and a water reception dish 107 are provided. When the lower wet roller 31A is rotated by a conveyance roller drive belt to rotate the upper wet roller 31B to convey the base plate 11 and cause the water to cling to the conductive layers thereon, the excess portion of the water is received by the dish 107 and sent back to the pump 103 through a drain hose. Besides, water removed at the time of the sticking of the laminated bodies 1B' to the electroconductive layers on the base plate 11b the heat and pressure sticking rollers 16 and water clinging to the laminated bodies stuck to the conductive layers are also received by the dish 10 and sent back to the pump 103 through the drain hose. The flow rate of the water from the pump 103 to the lower and the upper wet rollers 31A and 31B is regulated by the flow control valve 105 before the water reaches the rollers. The water is thus caused to cling as an air bubble preventive agent to the conductive layers on the electrically insulating base plate 11, by the lower and the upper wet rollers 31A and 31B of the wet roller unit 30, before the base plate and the laminated bodies 1B' are conveyed to the tentative sticking position. After the base plate 11 and the laminated body 1B' are conveyed to the tentative sticking position, the tentative sticking portion 10E is moved to the leading edge of the base plate to tentatively stick the leading edge of the laminated body to the conductive layer on the base plate. After the tentative sticking portion 10E is moved away from the base plate 11, the heat and pressure sticking roller 16 is moved into contact with the tentatively-stuck leading edge of the laminated body 1B' in the tentative sticking position and then rotated so that the base plate 11 is conveyed and the laminated body is completely stuck to the conductive layer on the base plate. Since the water is caused to cling to the electroconductive layer on the base plate 11 and enter into the minute recesses of the surface of the layer to remove air out of the recesses and dissolve the water-soluble photosensitive resin of the laminated body 1B' so that the solution of the resin acts as an adhesive, the laminated body is tightly stuck to the surface of the conductive layer and air bubbles are prevented from being generated or left between the mutually stuck surfaces of the body and the layer. As a result, the adhesive power between the stratified body 1B' and the conductive layer and the reliability of wirings of a printed circuit board made of the base plate and the conductive layer are enhanced. It will be understood from the above description that it is preferable that the photosensitive resin is water-soluble. A surface tension adjusting agent, a copper adhesive agent or the like may be added to the water to make it easier for the water to cling to the electroconductive layer on the base plate 11.

As shown in FIG. 1, a sensor S1 for detecting the position of the leading edge of the base plate 11 is provided at the upstream conveyor 1, near the conveyance passage for the base plate, upstream to the tentative sticking position. When the sensor S1 has detected the leading edge of the base plate 11, the sensor sends out a detection signal for putting the present counter of a microcomputer into action. When the preset counter has counted a number corresponding to a predetermined length, the counter sends out a control signal for stopping the leading edge of the base plate 11 in the tentative sticking position. The sensor S1 is made of a photoelectric switch, for example.

Another sensor S2 for detecting the position of the trailing edge of the base plate 11 is provided at the upstream conveyor 17, near the base plate conveyance passage, upstream to the other sensor S1. When the sensor S2 has detected the trailing edge of the base plate 11, the sensor sends out a detection signal for putting the other present counter of the microcomputer into action. When the preset counter has counted a number corresponding to a predetermined time, the counter sends out a control signal which acts so that after the stratified body 1B is formed with the loose portion 1B' and cut off at the portion by the cutoff unit 14 to make the trailing edge of the laminated body, the trailing edge is stuck, under heat and pressure, to the base plate 11. Besides, the present counter sends out a control signal for moving the heat and pressure vicinity of the put-aside position. The sensor S2 is made of a photoelectric switch, for example.

As shown in FIGS. 1 and 2, a downstream conveyor 8 including lower conveyance rollers 1A and upper conveyance rollers 18B is provided so that the electrically insulating base plate 11 with the laminated bodies 1B stuck to the conductive layers on the base plate by the heat and pressure sticking rollers 16 is conveyed to a light exposure apparatus for making wiring patterns As shown in FIGS. 1 and 2, thin film correctors 19 are provided on the apparatus body 7, the upstream conveyor 17 or the support members 17, near the movement passage for the tentative sticking portions 10E. Each thin film corrector 19 acts to put the leading edge of the stratified body 1B into such a direction G as to bring the edge into tight contact with the tentative sticking portion 10E. The thin film corrector 19 includes a fluid feed pipe 19A extending along the width of the stratified body 1B, and a plurality of fluid blowoff holes 19B provided in the pipe. A fluid higher in pressure than the atmosphere is caused to flow in the fluid feed pipe 19A. Although the cross section of the pipe 19A is nearly circular in this embodiment, the cross section may be square or elliptic. The fluid is blown off from the holes 19B, in such directions as to correct the leading edge of the laminated film 1B the fluid may be other gas such as insert gas or a liquid such as water and oil.

As shown in FIGS. 1 and 2, thin film protruders 20 are provided on the apparatus body 7, the upstream conveyors 17 or the support members 12, near the movement passages for the laminated bodies 1B]' between the auxiliary vacuum suction plates 13 ad the rotary vacuum suction plates 15 so that each protruder forms the laminated body 1B with the loose portion 1B' protruded in such a direction as to put the portion into tight contact with the heat and pressure sticking roller 16. Each protruder 20 includes a fluid feed pipe 2A extending along the width of the laminated body 1B, and a plurality of fluid blow off holes 20B provided in the pipe. A fluid higher in pressure than the atmosphere is caused to flow in the pipe 20A. Although the cross section of the pipe 20A is nearly circular in this embodiment, the cross section may be square or elliptic. The holes 20B are provided in the pipe 20A to blow off the fluid in the direction H to protrude the stratified body 1B to form it with the loose portion 1B'. Although the fluid is air in this embodiment, the fluid may be other gas such as inert gas or a liquid such as water and oil.

Each of the thin film correctors 19 and the thin film protruders 20 may be made of a plurality of fluid blow-off nozzle units juxtaposed along the width of the laminated body 1B to blow off the fluid to corrector protrude the body in the proper direction. Each of the correctors 19 and the protruders 20 may be made of a suction pipe extending along the width of the laminated body 1B, and a plurality of suction holes provided in the pipe to suck the body i the proper direction to correct or protrude the body. Each of the correctors 19 and the protruders 20 may be made of a thruster which thrusts the laminated body 1B in the proper direction to corrector protrude the body. The correctors 19 may be substituted by the protruders 20, or the protruders may be substituted by the correctors.

As shown in FIGS. 1 and 2, a base plate guide member 21 is provided at the apparatus body 7 or the downstream conveyor 18, between the heat and pressure sticking roller 16 and the driving conveyance rollers 18A of the conveyor so that the electrically insulating base plate 11 with the laminated bodies 1B stuck to the conductive layers on the base plate by the heat and pressure sticking rollers 16 is guided from the heat and pressure sticking position for the base plate and the laminated body to the conveyance rollers 18A and 18B of the conveyor by the guide member. The base plate guide member 21 is made of a plurality of bars extending in the direction of the conveyance of the base plate 11 and juxtaposed along the width thereof so that the guide member is shaped as a comb. Since the area of contact between the guide member 21 and the base plate 11 at the time of the conveyance thereof is small, the frictional resistance between them is so low that the base plate is smoothly guide by the guide member. The guide member 11 may be made of a plate or a net.

A method of sticking the laminated body 1B, under heat and pressure, to the conductive layer on the electrically insulating base plate 11 by the thin film -sticking apparatus is now described with reference to FIGS. 1 and 2. The leading edge of the laminated body 1B divided from the light-transmissible resin film 1A at the thin film separation roller 3 is first manually put in between the auxiliary vacuum suction plate 13 and the cutoff unit 14. The leading edge of the laminated body 1B is then sucked by the plate 13. After that, the plate 13 is moved away from the feed passage for the laminated body 1B to a position by the driver 13A, and the leading edge of the body is sucked by the tentative sticking portion 10E. At that time, the main vacuum suction plate 10 and the tentative sticking portion 10E are put into sucking action, and the laminated body 1B is put into the proper direction by the thin film corrector 19 so that the leading edge of the stratified body is surely sucked onto the tentative sticking portion. If the thin film sticking apparatus is already in continuous operation, the leading edge of the laminated body 1B cut off by the cutoff unit 14 is automatically sucked onto the tentative sticking portion 10E.

The base plate 11 is conveyed by the driving conveyance rollers 17A and idle conveyance rollers 17B of the upstream conveyor 17. Before the base plate 11 is conveyed to the tentative sticking position, the water is caused to cling to the electroconductive layers on the base plate by the lower and upper wet rollers 31A and 31B of the wet roller unit 30. When the leading edge of the base plate 11 passes through a leading edge detection position, the sensor S1 detects the leading edge of the base plate and sends out the detection signal to the microcomputer so that the present counter thereof counts the number corresponding to a predetermined time, to stop the leading edge in the tentative sticking position, and the other present counter of the microcomputer counts a number corresponding to another predetermined time, at the end of with the movement of the tentative sticking portion 10E to the conveyance passage for the base plate 11 is started during the conveyance of the leading edge of the base plate from the leading edge detection position to the tentative sticking portion . In that state, the tentative sticking portion 10e on the main vacuum suction plate 10 is in a tentative sticking start position, and the heat and pressure sticking roller 16 is in the put-aside position. At the time of the start of the tentative sticking, the upper and the lower support members 12 are in the stopped positions thereof nearest the base plate conveyance passage, and the driver 12D for moving the main vacuum suction plates 1 is in action.

The movement of the tentative ticking portion 10E to the base plate conveyance passage is started, during the conveyance of the leading edge of the base plate 11 from the leading edge detection position to the tentative sticking position, by controlling the driver 12D through the microcomputer on the basis of the output signal from the latter preset counter.

When the leading edge of the base plate 11 has reached the tentative sticking position, the conveyance of the base plate is stopped on the basis of the output signal from the former preset counter. Substantially at the same time as the stoppage of the conveyance of the base plate 11 or slightly after the stoppage, the tentative sticking portion 10E is moved to the electroconductive layer on the base plate 1 at the leading edge thereof so that the leading edge of the laminated body 1B sucked on the tentative sticking portion is tentatively stuck, under heat and pressure, to the conductive layer at the leading edge thereof.

As described above, the leading edge of the base plate 11 is detected in the leading edge detection position before the arrival of the base plate at the tentative sticking position so that the detection signal is generated to stop the leading edge of the base plate in the tentative sticking position and move the tentative sticking portion 10E to the vicinity of the base plate conveyance passage to tentatively stick the leading edge of the laminated body 1B to the conductive layer on the base plate by the tentative sticking portion after the leading edge of the base plate is stopped in the tentative sticking position. Since the tentative sticking portion 10E is thus moved to the vicinity of the base plate conveyance passage within the period of the conveyance of the leading edge of the base plate 11 from the leading edge detection position to the tentative sticking position, the time taken to tentatively stick the leading edge of the laminated body 1B to the conductive layer on the base plate 11 is shortened in comparison with an art in which the movement of the tentative sticking portion to the base plate conveyance passage is started when or after the leading edge of the base plate has reached the tentative sticking position. As a result, the number of laminated bodies stuck per unit time is increased to enhance the efficiency of the sticking.

When the tentative sticking portion 10E has reached the conductive layer on the base plate 11 at the leading edge thereof, the driver 12D is put into action. This step is notified to the microcomputer so that the tentative sticking portion 10E is kept in tentative sticking action on the laminated body 1B on the electroconductive sticking action on the base plate 11 for a prescribed time. After that, the main vacuum suction plate 10 and the tentative sticking portion 10E are moved away from the base plate conveyance passage so that the tentative sticking portion is put out of the tentative sticking action. At that time, the main vacuum suction plate 10, the tentative sticking portion 10E and the auxiliary vacuum suction plate 13 are moved, by the drivers 12C and 12D, away from the base plate conveyance passage to positions which are farther from the passage than the other positions shown in FIGS. 1 and 2. The distance of the movement is proportional to the quantity of the looseness of the loose portion 1B' of the laminated body 1B. Before the main vacuum suction plate 10 and the tentative sticking portion 10e are moved away from the base plate conveyance passage by the drivers 12C and 12D, air is blown off from the air blowing nozzle unit 100 into the space among the main vacuum suction plate 10, the tentative sticking portion 10E, the auxiliary vacuum suction plate 13 and the laminated body 1B so that the body is separated from the main vacuum suction plate and the tentative sticking portion.

The heat and pressure sticking roller 16 is thereafter moved from the put-aside position shown by the dotted line in FIG. 1, to the tentative sticking position shown by the full line therein, so that the roller is put into contact with the stratified body 1B whose leading edge is already tentatively stuck to the conductive layer on the base plate 11. The base plate 11 is thus pinched by the upper and the lower heat and pressure sticking rollers 16. The rollers 16 are then rotated so that the base plate 11 is conveyed and the upper and the lower laminated bodies 1B are completely stuck, under heat and pressure, to the conductive layers on the upper and lower sides of the base plate 11. At that time, since the main vacuum suction plates 10, the tentative sticking portions 10E and the auxiliary vacuum suction plates 13 are out of sucking action, the laminated bodies 1B are automatically fed from the feed rollers 2 to the heat and pressure sticking rollers 6 by the rotating forces and base plate pinching forces of the rollers 6. The water remaining on the stratified bodies 1B stuck t the conductive layers on the base plate 11 is removed from the laminated bodies by the water suction unit 80 downstream to the heat and pressure sticking rollers 16.

When the trailing edge of the base plate 11 passes through a trailing edge detection position, the trailing edge is detected by the sensor S2 so that the sensor sends out the detection signal to the microcomputer to out the main vacuum suction plate 10, the auxiliary vacuum suction plate 13 and the rotary vacuum suction plate 15 into sucking action substantially at the same time. The support member 12 is moved, by the driver 12C, from the position farthest from the base plate conveyance passage, so that the main vacuum suction plate 10 excessively feeds the laminated body 1B toward the base plate 11, and the lower sucking portion 13B of the auxiliary vacuum suction plate 13 puts the to-be-cut-off portion of the laminated body into the position of cutoff by the cutoff unit 14 as shown in FIG. 2. The speed of the feed of the laminated body 1B, which is equal to the speed of the movement of the support member 12, is set to be higher than the speed of the heat and pressure sticking by the heat and pressure sticking roller 16, which is equal to the circumferential velocity of the roller. For that reason, the laminated body 1B is formed with the loose portion 1B' between the auxiliary vacuum suction plate 13 and the rotary vacuum suction plate 15. The thin film corrector 19 acts so that both the ends of the loose portion 1B' are surely sucked onto the lower sucking portion 13b of the auxiliary vacuum suction plate 13 and the rotary vacuum suction plate 15, respectively. The to-be-cut-off portion of the laminated body 1B, which is put in the position of cutoff by the cutoff unit 14, is cut off by the unit so that the cut-off laminated body has a prescribed length corresponding to the length of the electrically insulating base plate 11. The heat and pressure sticking roller 16 is then moved in the same direction as the conveyance of the base plate 11 which sticking the cut-off laminated body 1B near the trailing edge thereof, under heat and pressure, to the conductive layer on the base plate. The heat and pressure sticking roller 16 is moved further along with the conveyance of the baseplate 11 until the laminated body 1B is stuck at the trailing edge thereof, under heat and pressure, to the conductive layer on the base plate 11 by the rotary vacuum suction plate 15. The heat and pressure sticking roller 16 is moved to the vicinity of the put-aside position. The rotary vacuum suction plate 15 is rotated at a slightly lower speed than the heat and pressure sticking roller so as to stick the laminated body 1B at the trailing edge thereof, under heat and pressure, to the conductive layer on the base plate 11. Since the rotary vacuum suction plate 15 is rotated at the slightly lower speed than the heat and pressure sticking roller 16, an appropriate tensile force is applied to the laminated body 1B between the suction plate 16 and the roller 16 so that the laminated body does not undergo a wrinkle or the like as the body is stuck, under heat and pressure, to the conductive layer on the base plate 11. After the laminated body 1B is completely stuck, under heat and pressure to the conductive layer on the base plate 11, the heat and pressure sticking roller 16 is moved from the vicinity of the put-aside position to that position, in such a direction as to become more distant from the base plate conveyance passage.

The present invention is not confined to the above-described embodiment, but may be embodiment or practiced in other various ways without departing from the spirit or essential character thereof. For example, the present invention may be embodied as a thin film sticking apparatus in which an electrically insulating base plate and conductive layers provided thereon are heated in advance and laminated bodies are thereafter stuck, under heat and pressure, to the conductive layers by a non heat pressure sticking roller. Besides, the present invention may be embodied as a ornamental panel as a building material. According to the present invention, air bubbles are prevented from being generated or left between the mutually stuck surfaces of a baseplate and a thin film. For than reason, the adhesive power between the base plate and the thin film is enhanced. Besides, a contamination such as a water globule trace is prevented from being made on the thin film stuck to the base plate. For that reason, the reliability and yield in making a wiring pattern through exposure to light are improved.

We claim:

1. A method of laminating a thin film to a base plate, in which an air bubble preventive agent is caused to cling to said plate before said plate is conveyed to a tentative sticking position in a base plate conveyance passage; the leading edge of said films is tentatively stuck to the surface of said plate at the leading edge thereof; and a pressure sticking roller is put into contact with the tentatively-stuck leading edge of said film in said position and then rotated so that said plate is conveyed and said film is completely stuck to said plate, characterized in that said agent is caused to cling to said plate before said plate is conveyed to said position; and said agent remaining on said film stuck to said plate is removed form said film, downstream to said roller.

2. An apparatus for laminating a thin film to a base plate, in which the leading edge of said film is tentatively stuck to the surface of said plate at the leading edge of said plate in a base plate conveyance passage; and a pressure sticking roller means is put into contact with the leading edge of said film in a tentative sticking position and then rotated so that said plate is conveyed and said film is completely stuck to said plate, characterized by including a wet roller means provided on said passage, upstream to said position, to cause an air bubble preventive agent to cling to said plate; and a means for nearly uniformly feeding said agent from the interior of said wet roller means to the outside surface thereof.

3. The apparatus of claim 2, further comprising a means for removing said agent remaining on said film stuck to said plate, from said film, downstream of said pressure sticking roller means.

4. The apparatus of claim 3, wherein said wet roller means includes a roller composed of a pipe having a plurality of bubble preventive agent supply holes and a coating layer made of porous material.

5. The apparatus of claim 3, wherein said plurality of bubble preventive agent supply holes are formed in said pipe so that pairs of said bubble preventive agent supply holes are located diametrically opposite to each other.

6. The apparatus of claim 4, wherein said plurality of bubble preventive agent supply holes are formed in said pipe so that pairs of said bubble preventive agent supply holes are located diametrically opposite to each other.

7. The apparatus of claim 5, wherein said bubble preventive agent supply holes are offset by 90 degrees in a circumferential direction of said pipe and at a prescribed interval in an axial direction of said pipe.

8. The apparatus of claim 6, wherein said bubble preventive agent supply holes are offset by 90 degrees in a circumferential direction of said pipe and at a prescribed interval in an axial direction of said pipe.

9. The apparatus of claim 4, wherein said wet roller means is detachably mounted in a body of said apparatus.

* * * * *